United States Patent [19]

Sawatani

[11] Patent Number: 4,948,009

[45] Date of Patent: Aug. 14, 1990

[54] STRAW-INSERTABLE LID FOR PAPER CUP

[76] Inventor: Takashi Sawatani, 7-19, 1-chome, Kisaichiyamate, Katano-shi, Osaka, Japan

[21] Appl. No.: 458,555

[22] Filed: Dec. 28, 1989

[51] Int. Cl.$^5$ .............................................. B65D 54/00
[52] U.S. Cl. .................................. 220/229; 220/90.4; 220/254; 215/1 A
[58] Field of Search ..................... 220/90.2, 90.4, 90.6, 220/229, 254; 215/1 A, 317, 320, 321; 229/103.1

[56] References Cited

U.S. PATENT DOCUMENTS

| | | | |
|---|---|---|---|
| 2,948,453 | 8/1960 | Drown | 229/103.1 |
| 3,048,317 | 8/1962 | Cochrane et al. | 229/103.1 |
| 3,315,402 | 4/1967 | Parks | 229/103.1 X |
| 3,773,243 | 11/1973 | Greene | 229/103.1 |
| 3,822,030 | 7/1974 | Tanzer | 220/90.2 |
| 4,494,668 | 1/1985 | Lottick | 220/90.4 |

FOREIGN PATENT DOCUMENTS 8903351  4/1989  PCT Int'l Appl. ................. 215/321

Primary Examiner—Stephen Marcus
Assistant Examiner—Nova Stucker
Attorney, Agent, or Firm—George B. Oujevolk

[57] ABSTRACT

Disclosed in a straw-insertable lid for a paper cup which is placed on an upper end of a paper cup in which a beverage such as tea, coffe, a soft drink, fruit juice, or the like, a sherbert-like beverage of any of these beverages, or the like is accommodated singly or together with crushed ice so as to allow the beverage to be drunk by inserting a straw through the straw-inserting slit provided in the top plate portion. The upper lid is formed of natural rubber, and a protruding outer ring is provided on the top plate portion around the slit. As a result, when the lids are disposed of by being dumped as rubbish after use, the lids easily decompose, thereby preventing the dumped lids from constituting a source of environmental destruction. At the same time, when the straw is inserted through the slit, the protruding annuular ring prevents the slit from becoming easily being ripped large.

5 Claims, 1 Drawing Sheet

U.S. Patent     Aug. 14, 1990     4,948,009
FIG. 1
FIG. 2
FIG. 3
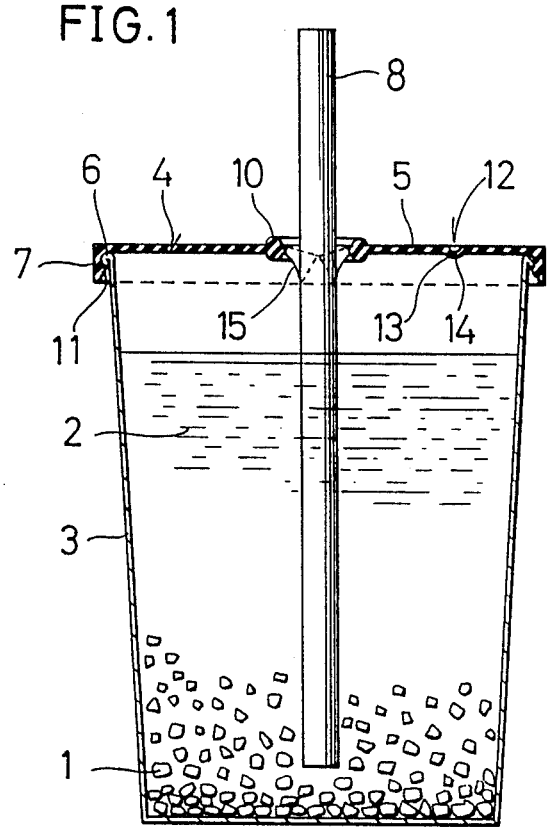
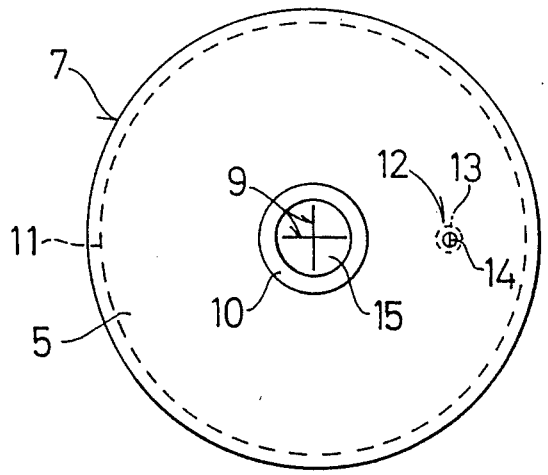

STRAW-INSERTABLE LID FOR PAPER CUP

BACKGROUND OF THE INVENTION

The present invention relates to a straw-insertable lid for a paper cup, and more particularly to a straw-insertable lid for a paper cup for accommodating beverages therein such as tea, a soft drink, fruit juice or the like, a sherbet-like beverage of any of these beverages, or the like singly or together with crushed ice, such a beverage being served to customers with or without a snack such as a hamburger, fried chicken, a sandwich, or the like at fast-food restaurants specializing in such as hamburgers, fried chicken, and sandwiches and at snack corners of department stores, supermarkets, convenience stores, and the like.

A conventionally known straw-insertable lid for a paper cup of this type is formed of a plastic and, as shown in FIG. 3, comprises a top plate portion 22 for covering an opening at an upper end of a paper cup 21; a peripheral sidewall portion 23 which is disposed around an outer peripheral edge of the top plate portion in such a manner as to project downward and is fitted with an outer periphery of a rim of the paper cup; and cross-shaped slits 25 provided in the top plate portion 22 and adapted to allow a straw 24 to be inserted therethrough.

With such a conventional lid, there has been a problem in that since they are formed of plastics, if the lids after being used are disposed of by being dumped as rubbish, they do not decompose at all and constitute a major source of environmental destruction.

According to the Aug. 29, 1989, issue of the noted American economic journal "Fortune", the total volume of plastics produced annually in the United States reaches about 27 million tons. The journal also reports that the volume of plastics dumped accounts for almost 25% of the total volume of rubbish, the figure being the second largest next to paper which accounts for 40%. Although 80% of such rubbish is disposed of by dumping, dumping sites are said to become full in 10 to 20 years. For this reason, during the last two years, more than 800 bills for controlling rubbish, centering on plastics, were proposed in various municipalities at the local government level. Stipulations for control which these bills called for, among others, include the levying of a tax on packages and permission of disposal of only the rubbish whose matter decomposition rate exceeds a certain level.

In addition, in the case of the above-described conventional lid, there is a possibility that the cross-shaped slits for insertion of a straw therethrough that are provided in the top plate portion of the lid can be inadvertently ripped large by the insertion of the straw therethrough. Hence, there has been the problem that if the paper cup falls by accident or by being carelessly handled, its content is spilt through the slits ripped large, as described above.

Furthermore, with the above-described conventional lid, there has been another drawback in that if the manufactured state of the lid is poor by any slightest degree, the lid easily comes off the paper cup since it is made of a plastic.

Moreover, with the above-described conventional lid, which is formed of a plastic, there has been still another drawback in that since there is a gap in the cross-shaped slits for the insertion of the straw, if the paper cup falls by being carelessly handled or is shaken, its content is spilled through the gap of the slits.

SUMMARY OF THE INVENTION

Accordingly, the prime object of the invention is to overcome the above-described drawbacks of the straw-insertable lid for a paper cup.

Namely, a first object of the present invention is to provide an improved straw-insertable lid for a paper cup which, when disposed of by being dumped as rubbish after use, will decompose easily and will not cause environmental destruction.

A second object of the present invention is to provide an improved straw-insertable lid for a paper cup in which slits for insertion of a straw will not be inadvertently ripped large by the insertion of the straw therethrough.

A third object of the present invention is to provide an improved straw-insertable lid for a paper cup which will not come off readily even if the manufactured state of the lid is slightly poor and the dimensions of the lid do not exactly conform to the design.

A fourth object of the present invention is to provide an improved straw-insertable lid for a paper cup in which even if the paper cup falls by being carelessly handled or is shaken after the straw is inserted into slits for insertion, its content will not be spilt through the aforementioned slits.

To these ends, in accordance with the present invention, there is provided a straw-insertable lid for a paper cup, comprising: a top plate portion for covering an opening at an upper end of a paper cup in which a beverage such as tea, coffer, a soft drink, fruit juice, or the like, a sherbet-like beverage of any of these beverages, or the like can be accommodated singly or together with crushed ice; a peripheral side wall portion which is disposed around an outer peripheral edge of the top plate portion in such a manner as to project downward and is fitted with an outer periphery of a rim of the paper cup; at least one slit for the insertion of a straw therethrough and provided in the top plate portion; and a protruding outer ring provided in the top plate portion around the slit, wherein the lid is formed of natural rubber (including Latex).

In accordance with a preferred form of the invention, the protruding outer ring is formed only on an upper surface of the top plate portion.

In accordance with another preferred form of the invention, the protruding outer ring is formed only on a lower surface of the top plate portion.

In accordance with still another preferred form of the invention, the protruding outer ring is formed on both an upper and a lower surface of the top plate portion.

In accordance with a further preferred form of the invention, the slit for insertion is formed into a configuration of a cross.

In accordance with a still further preferred form of the invention, the slit for insertion is formed into a configuration of a straight line, a letter V, or a letter Y.

In accordance with a further preferred form of the invention, the straw-insertable lid for a paper cup further comprises an annular protrusion formed on an intermediate portion of an inner periphery of the peripheral side wall portion in such a manner as to tuck in the rim of the paper cup.

In accordance with a further preferred form of the invention, the straw-insertable lid for a paper cup further comprises an air valve formed at an appropriate position in the top plate portion.

In accordance with a further preferred form of the invention, the air valve is formed by a recessed portion provided by concaving a portion of the top plate portion into a semispherical shape and a slit for the influx of air provided in the recessed portion.

The above and other objects, features and advantages of the invention will become more apparent from the following detailed description of the invention when read in conjunction with the accompanying drawings.

BRIEF DESCRIPTION OF THE DRAWINGS

FIG. 1 is a vertical cross-sectional view illustrating a state in which a straw-insertable lid for a paper cup in accordance with the present invention is put on a paper cup and a straw is inserted therethrough;

FIG. 2 is a top plan view of the lid; and

FIG. 3 is a perspective view illustrating a state in which a conventional straw-insertable lid for a paper cup is put on a paper cup and a straw is inserted therethrough.

DETAILED DESCRIPTION

In FIG. 1, crushed ice 1 and a beverage 2 such as tea, coffee, a soft drink, fruit juice, or the like are placed in a paper cup 3.

In FIGS. 1 and 2, a straw-insertable lid for a paper cup in accordance with an embodiment of the present invention is formed of natural rubber (including Latex) and comprises a top plate portion 5, a peripheral side wall portion 7, slits 9 for insertion of a straw 8, a protruding outer ring 10, and an air valve 12.

The top plate portion 5 is adapted to cover an opening 4 at an upper end of the paper cup 3, the peripheral side wall portion 7 is provided around an outer peripheral edge of the top plate portion 5 in such a manner as to project downward.

The slits 9 for insertion of the straw 8 therethrough which are formed in the shape of a cross are provided in a central portion of the top plate portion 5. The protruding outer ring 10 is provided only on the upper surface of the top plate portion 5 around the slits 9.

An annular protrusion 11 is provided on an intermediate portion of the inner periphery of the peripheral side wall portion 7 in such a manner as to tuck in a rim 6 of the paper cup 3.

The air valve 12 comprises a recessed portion 13 provided by concaving a portion of the top plate portion 5 into a semispherical shape and slits 14 for the influx of air provided in the recessed portion 13, as in the case of a conventional air valve provided in a nipple of a nursing bottle for an infant.

As shown in FIG. 1, the straw-insertable lid for a paper cup arranged as described above is used in the following procedure: First, the crushed ice 1 and the beverage 2 such as tea, coffee, a soft drink, fruit juice, or the like are poured into the paper cup 3. Then, the lid is placed on the paper cup 3, and the straw 8 is inserted through the slits 9 for inserting the straw 8.

In this case, the insertion of the straw 8 may be carried out by a staff of such as a fast-food restaurant or by the customer.

As described above, with the lid placed on the paper cup 3, since the lid is formed of natural rubber, the peripheral side wall portion 7 is resiliently and firmly fitted with the outer periphery of the rim 6. In addition, no gaps are formed in the slits 9 for the insertion of the straw 8 or in the slits 14 for the influx of air for the air valve 12, as shown in FIG. 2.

Accordingly, in the above-described arrangement, airtightness for the interior of the paper cup is maintained practically completely, In a case where the straw 8 is inserted into the slits 9 of the lid in this state, as shown in FIG. 1, for the same reason as stated above, i.e., since the lid is formed of natural rubber, the straw 8 is resiliently pushed by bent pieces 15 formed between one slit 9 and another slit 9, so that the airtightness of this inserting portion can be maintained.

Accordingly, when the content 2 is sucked through the straw 8 from the paper cup in the state as shown in FIG. 1, if the air valve 12 were not formed, it would be difficult to suck the content 2 and the paper cup 3 might be crushed by a vacuum created inside the paper cup 3. However, since the air valve 12 is formed, air flows in through the slits 14 for the influx of air which are provided in the recessed portion 13 of the air valve 12, thereby facilitating the suction of the content 2 and preventing the paper cup 3 from becoming crushed by the vacuum.

The protruding outer ring 10 provided on the top plate portion 5 around the slits 9 for the insertion of the straw 8 prevents the slits 9 from becoming ripped large inadvertently by the insertion of the straw 8 therethrough.

If the protruding outer ring 10 is formed only on the upper surface of the top plate portion 5, as shown in FIGS. 1 and 2, it is possible to clearly show the position of the slits 9 through which the straw 8 is to be inserted.

In addition, if the protruding outer ring is formed only on the lower surface of the top plate portion 5, the position of the slits 9 through which the straw 8 is to be inserted can be shown less clearly. Nonetheless, the effect of preventing the slits from becoming ripped large inadvertently by the insertion of the straw 8 therethrough is identical with that for the protruding outer ring 10 shown in FIGS. 1 and 2.

Furthermore, if the protruding outer ring is formed on both the upper and lower surfaces of the top plate portion 5, it goes without saying that effects similar to those of the protruding outer ring 10 can be obtained, and it is possible to more positively prevent the slits 9 from becoming ripped large inadvertently by the insertion of the straw 8 therethrough.

If the aforementioned slits for insertion are formed into the shape of a straight line, a letter V, or a letter Y, the straw 8 can be inserted into the slits in the respective cases.

In the case where the annular protrusion 11 on the intermediate portion of the inner periphery of the peripheral side wall portion 7 in such a manner as to tuck in the rim 6 of the paper cup 3, the peripheral side wall portion 7 can be more firmly fitted with the outer periphery of the rim 6 of the paper cup 3 in addition to the inherent resiliency of natural rubber.

Since the lid for a paper cup in accordance with the present invention is arranged as described above, the invention displays the following advantages.

Firstly, since it is formed of natural rubber, when it is disposed of by dumping as rubbish after use, the lid decomposes readily and does not lead to environmental destruction.

Secondly, since it is formed of natural rubber, the peripheral side wall portion of the lid is resiliently fitted firmly with the outer periphery of the rim of the paper cup, so that even if the manufactured state of the lid is slightly poor and the dimensions of the lid do not exactly conform to the design, the lid can be fitted in such a manner that will not come off easily.

Thirdly, since it is formed of natural rubber, no gaps are formed at the slits for the insertion of the straw, so that even when the paper cup is carelessly handled and falls, it is possible to prevent the content from being spilt from this portion.

Fourthly, since it is formed of natural rubber, when a straw is inserted into the slits for insertion, the straw is resiliently pressed by each of the bent pieces formed between one slit and another. Hence, even when the paper cup falls by being carelessly handled or is shaken, it is possible to prevent the content from being spilt through the portion of the slits.

Fifthly, since the protruding annular ring is formed on the top plate portion around the slits for the insertion of the straw, it is possible to prevent the slits for the insertion of the straw from being ripped large by the insertion of the straw therethrough, and, at the same time, it is possible to clearly indicate the position of the slits through which the straw is to be inserted.

Sixthly, since the air valve is provided at an appropriate position of the opt plate portion of the lid, when the lid is placed on the cut and the content is sucked, since air flows in through the air valve, the sucking of the content is facilitated, and the possibility of the paper cup being crushed by a vacuum created inside the cup can be eliminated. In particular, if the air valve is formed by the recessed portion and the slits for the influx of air such as those specifically illustrated, the air valve can demonstrate an effect similar to that of the air valve provided in the nipple of a conventional nursing bottle for infants.

Seventhly, by virtue of the aforementioned first to sixth effects, the paper cup using the straw-insertable lid for a paper cup in accordance with the present invention may be used without a problem by infants, the elderly people, and in-patients, and may be used without trouble in vehicles or during stand-up meals in various events.

It should be noted that the present invention is not restricted to the above-described specific examples, and various other modifications are possible without departing from the spirit of the invention which is defined solely in the appended claims.

For instance, the slits for the insertion of the straw and the protruding outer ring may be provided at positions other than the central portion of the top plate portion.

In addition, the peripheral protrusion provided on the intermediate portion of the inner periphery of the peripheral side wall portion may be provided at a lower end portion on the inner periphery of the peripheral side wall portion, or on a lower end portion of an outer periphery thereof.

Furthermore, the air valve may be provided with other configurations.

What is claimed is:

1. A straw-insertable lid for a paper-cup, comprising: a top plate portion (5), with an upper and a lower surface, for covering an opening (4) at an upper end of a paper cup (3) in which a beverage (2) such as tea, coffee, a soft drink fruit juice, or the like, a sherbet-like beverage of any of these beverages, or the like can be accomodated singly or together with crushed ice (1);

a peripheral side wall portion (7) which is disposed around an outer peripheral edge of said top plate portion (5) in such a manner as to project downward and is fitted with an outer periphery of a rim (6) of said paper cup (3);

at least one slit (9) for the insertion of a straw (8) therethrough and provided in said top plate portion (5); and a protruding outer ring (10) formed on both said upper and lower surfaces of said top plate portion (5) around said slit (9);

wherein said lid is formed of natural rubber including Latex.

2. A straw-insertable lid for a paper cup according to claim 1 wherein said slit for insertion is formed into a configuration of a cross.

3. A straw-insertable lid for a paper cup according to claim 2, further comprising an annular protrusion (11) formed on an intermediate portion of an inner periphery of said peripheral side wall portion (7) in such a manner as to tuck said rim (6) of said paper cup (3).

4. A straw-insertable lid for a paper cup according to claim 2, further comprising an air valve formed at an appropriate position in said top plate portion (5).

5. A straw-insertable lid for a paper cup according to claim 4, wherein said air valve (12) is formed by a recessed portion (13) provided by concaving a portion of said top plate portion (5) into a semispherical shape and a slit (14) for the influx of air provided in said recessed portion (13).

* * * * *